United States Patent
Crapo et al.

(10) Patent No.: US 7,034,423 B2
(45) Date of Patent: *Apr. 25, 2006

(54) ELECTRIC POWER STEERING SYSTEM INCLUDING A PERMANENT MAGNET MOTOR

(76) Inventors: Alan D. Crapo, 16716 Jamestown Forest Dr., Florissant, MO (US) 63034; Todd A. Walls, 1053 Raritan, Rock Hill, MO (US) 63119; Richard E. Hartsfield, Jr., 2176 Silverwood La., Chesterfield, MO (US) 63017

( * ) Notice: Subject to any disclaimer, the term of this patent is extended or adjusted under 35 U.S.C. 154(b) by 17 days.

This patent is subject to a terminal disclaimer.

(21) Appl. No.: 10/431,263

(22) Filed: May 7, 2003

(65) Prior Publication Data

US 2003/0201137 A1    Oct. 30, 2003

Related U.S. Application Data

(63) Continuation of application No. 09/774,214, filed on Jan. 30, 2001, now Pat. No. 6,597,078.

(51) Int. Cl.
*H20K 1/12* (2006.01)

(52) U.S. Cl. ............... 310/152; 310/156; 310/184

(58) Field of Classification Search ............ 310/152, 310/156, 184
See application file for complete search history.

(56) References Cited

U.S. PATENT DOCUMENTS

| | | | | |
|---|---|---|---|---|
| 4,009,406 | A | * | 2/1977 | Inariba ............... 310/164 |
| 5,006,745 | A | | 4/1991 | Nishio et al. |
| 5,164,622 | A | * | 11/1992 | Kordik ............... 310/67 R |
| 5,753,991 | A | * | 5/1998 | Couture ............... 310/156 |
| 5,982,067 | A | * | 11/1999 | Sebastian et al. ....... 310/184 |
| 6,140,728 | A | * | 10/2000 | Tomita et al. .......... 310/156 |
| 6,262,507 | B1 | * | 7/2001 | Sato et al. ............ 310/152 |

FOREIGN PATENT DOCUMENTS

| EP | 0 392 028 | 10/1990 |
|---|---|---|
| EP | 0 483 372 | 5/1992 |

OTHER PUBLICATIONS

"Influence of Design Parameters on Cogging Torque in Permanent Magnet Machines", Zhu Z Q et al., IEEE transactions on Energy Conversion, IEEE Inc., New York, US, vol. 15, NR. 4 pp. 407-412.

* cited by examiner

*Primary Examiner*—Darren Schuberg
*Assistant Examiner*—Iraj A. Mohandesi

(57) ABSTRACT

An electric power steering system for a vehicle includes a steering wheel and a steering shaft that is connected to the steering wheel. A worm gear is connected to the steering shaft. A worm is threadably engaged to the worm gear. A permanent magnet motor is connected to the worm. The permanent magnet motor includes a stator with twelve slots and a rotor with ten poles. The rotor includes one or more axial rotor sections. If more than one axial rotor section is employed, the axial rotor sections are rotationally offset. The axial rotor sections are rotationally offset by an offset angle that is equal to a cogging angle divided by the number of axial rotor sections. The rotor includes breadloaf, spoke, radial or arc permanent magnets.

18 Claims, 8 Drawing Sheets

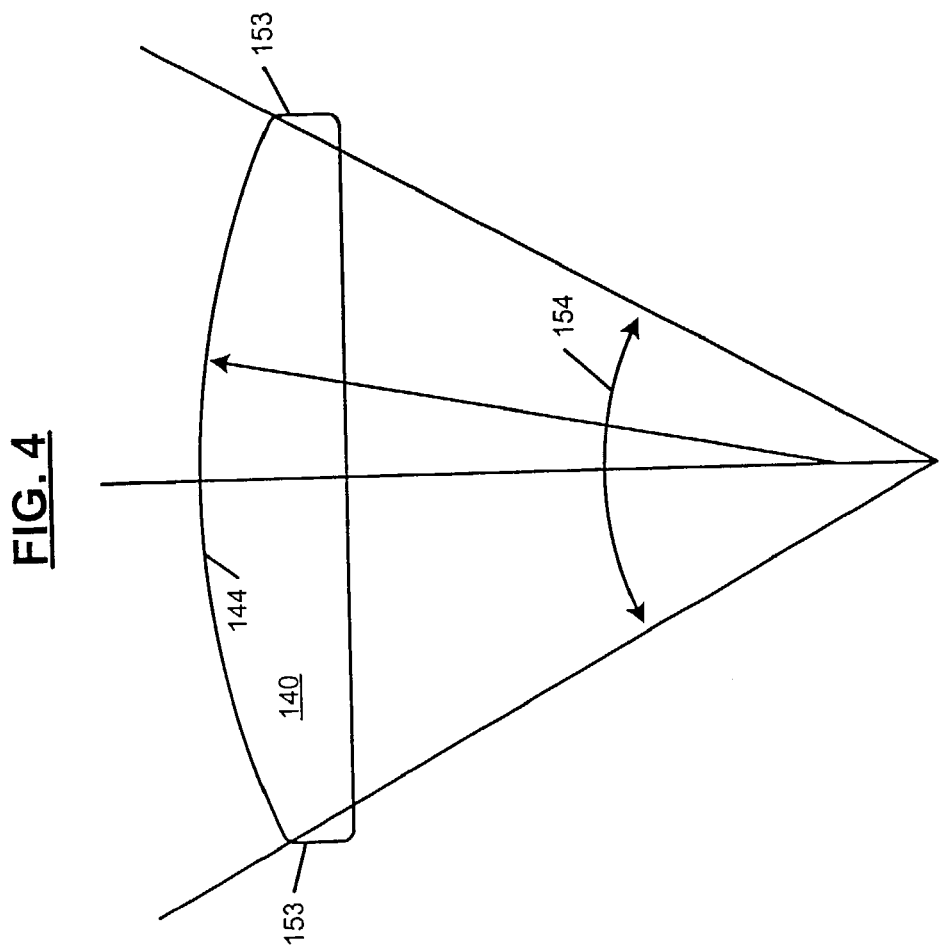
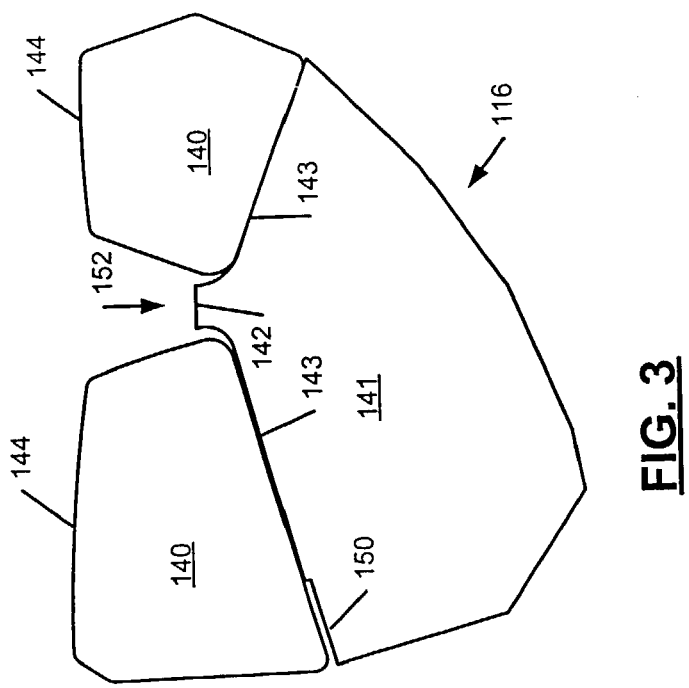

ELECTRIC POWER STEERING SYSTEM INCLUDING A PERMANENT MAGNET MOTOR

CROSS-REFERENCE TO RELATED APPLICATIONS

This application is a continuation of U.S. patent application Ser. No. 09/774,214 filed on Jan. 30, 2001 now U.S. Pat. No. 6,597,078. The disclosure(s) of the above application is incorporated herein by reference in its entirety.

FIELD OF THE INVENTION

This invention relates to electric power steering systems and, more particularly, to electric power steering systems that include a permanent magnet motor.

BACKGROUND OF THE INVENTION

Electric power steering (EPS) systems for vehicles such as automobiles and trucks typically include a steering wheel, an electric motor, a controller, one or more sensors, a steering shaft, and a steering gear assembly. The steering gear assembly can be a rack and pinion gear assembly, a recirculating ball steering gear assembly or any other suitable steering gear assembly. The electric motor is typically coupled to the steering shaft through a worm that is connected to the motor and a worm gear that is connected to the steering shaft.

The sensors typically include a torque sensor that provides a feedback signal to the controller. The feedback signal represents driver effort that is required to turn the steering wheel. As the driver effort increases, the electric motor rotates the worm that engages and rotates the worm gear. The worm gear is connected to the steering shaft and reduces driver effort that is required to turn the steering wheel. Other sensed parameters typically include a rotational sensor that senses steering shaft rotational position and that provides a feedback signal to the controller. Vehicle velocity is also typically input to the controller so that the assist provided by the EPS system varies as a function of vehicle speed.

EPS systems offer improvements over conventional hydraulic assist systems by reducing overall vehicle weight and improving fuel economy. In addition, EPS systems allow for precise electric control of the steering system. In addition to variable effort assist, the EPS systems can also provide steering wheel return characteristics that may be tuned to a desired feel and/or responsiveness. The amount of tactile feedback to the driver through the steering wheel may also be electrically controlled. Specifically, the steering torque provides information to the driver regarding road conditions and vehicle maneuverability. The amount of restoring torque is a function of the chassis design and the transmissibility of rack loads back to the steering wheel. The EPS systems provide active control of the transmissibility characteristics and therefore the amount of tactile feedback to the driver.

The electric motors that are used in EPS systems should have low levels of cogging torque, low torque ripple, and high torque density. Conventional permanent magnet motors that have been employed in EPS systems generally have a 1.5 slot/pole ratio (such as 6/4, 12/8, and 18/12), or a 3.0 slot/pole ratio (such as 36/12). The motors with the 1.5 slot/pole ratio have high magnitude, low-frequency cogging torque and large magnitude torque ripple. The motors with the 3.0 slot/pole ratio have high magnitude, low-frequency cogging torque, large magnitude torque ripple, and low-power density. Skewing of the rotor or stator is usually required to reduce the cogging torque. The addition of the rotor or stator skew reduces the power density of the motor and increases the cost of both materials and manufacturing. For example, skewing the rotor generally involves the use of permanent magnets that have a complex shape. These permanent magnets are difficult to manufacture and to handle during the assembly process, which increases the manufacturing costs of the motor. The cost penalties that result from rotor or stator skew become greater as the amount of skew is increased. In general, the amount of skew increases with decreasing cogging torque frequency.

Therefore, an EPS system that includes a permanent magnet motor with relatively low cogging torque, low torque ripple and high power density is desirable. The permanent magnet motor should be assembled and manufactured at a relatively low cost as compared to the conventional permanent magnet motors described above.

SUMMARY OF THE INVENTION

An electric power steering system according to the invention for a vehicle includes a steering wheel and a steering shaft that is connected to the steering wheel. A permanent magnet motor is connected to the steering shaft and reduces driver effort that is required to turn the steering wheel. The permanent magnet motor includes a stator with twelve slots and a rotor that rotates relative to the stator and includes ten poles.

In other features of the invention, the rotor includes a rotor core with breadloaf magnets. An air gap ratio is between 1.0 at 2.5. The slot opening ratio is less than or equal to 1.0. A magnet dimension angle is between 31 and 35 degrees.

In other features of the invention, the rotor includes a rotor core with radial slots that extend in an axial direction between opposite end surfaces of the rotor core. Permanent magnets are positioned in the radial slots. Alternately, the rotor includes arc magnets that are positioned on an outer surface of the rotor core.

In still other features of the invention, the rotor includes one or more axial rotor sections. If more than one axial rotor section is employed, the axial rotor sections are axially and rotationally offset. The rotational offset is equal to a cogging angle divided by the number of axial rotor sections.

Still other objects, features and advantages will be readily apparent from the drawings, the specification and the claims that follow.

BRIEF DESCRIPTION OF THE DRAWINGS

FIG. 3 illustrates a partial view of the rotor between two adjacent permanent magnets;

FIG. 4 is a side view of a permanent magnet that illustrates a crown radius and a magnet dimension angle according to the present invention;

DETAILED DESCRIPTION OF THE PREFERRED EMBODIMENTS

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

Figure 1:
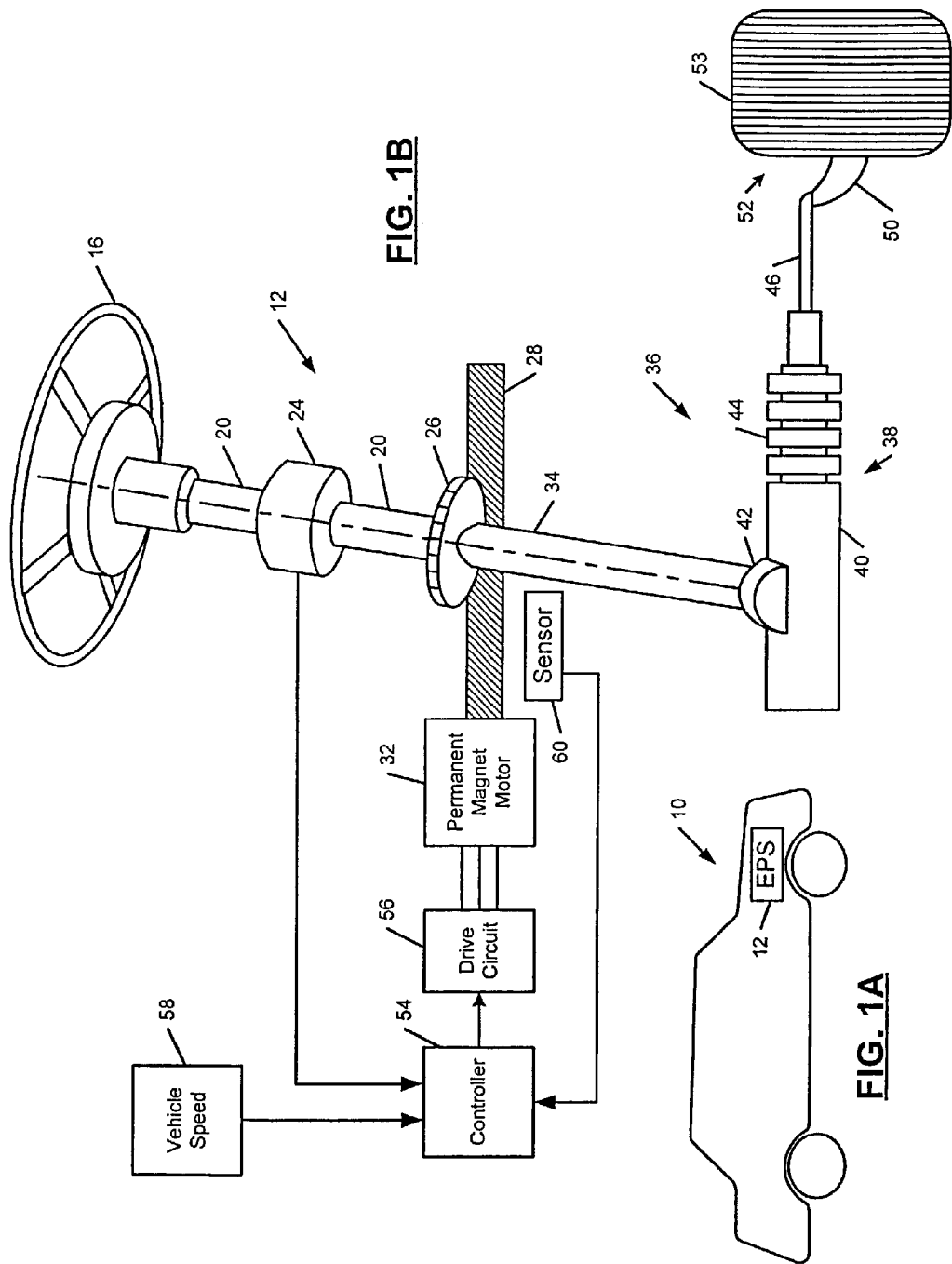
FIG. 1A illustrates a vehicle with an electric power (EPS) steering system.
FIG. 1B is a functional block diagram that illustrates the EPS system of FIG. 1A with a permanent magnet motor according to the present invention.

Referring now to FIGS. 1A and 1B, a vehicle 10 includes an electric power system steering (EPS) system 12. The EPS system 12 includes a steering wheel 16 that is connected to an upper steering shaft 20. A torque sensor 24 senses steering effort that is required to turn the steering wheel 16. A worm gear 26 is connected to the upper steering shaft 20 and is threadably engaged by a worm 28. The worm 28 is connected to an output shaft (not shown) of a permanent magnet motor 32.

A lower steering shaft 34 is connected to a steering gear assembly 36. A universal joint (not shown) may be used between the lower steering shaft 34 and the steering gear assembly 36 if needed. In a preferred embodiment, the steering gear assembly 36 is a rack and pinion gear assembly 38. However, skilled artisans will appreciate that the steering gear assembly 36 can be a recirculating ball gear assembly or any other suitable steering gear assembly. The rack and pinion gear assembly 38 includes a steering gear rack housing 40 and a pinion gear housing 42. The steering gear rack housing 40 encloses a steering rack (not shown) that is connected to an inner tie rod (not shown). The pinion gear housing 42 encloses a pinion gear (not shown) that is connected at one end to the lower steering shaft 34 and at an opposite end to the steering rack. A dust boot 44 provides a flexible enclosure for the steering rack and the inner tie rods as they move laterally when the driver steers the vehicle 10. An outer tie rod 46 is connected at one end to the inner tie rod. An opposite end of the outer tie rod 46 is connected to a steering knuckle 50, which is connected to a wheel 52 and a tire 53.

An EPS system controller 54 is connected to a drive circuit 56 that controls the permanent magnet motor 32. The torque sensor 24 is connected to the EPS system controller 54. A vehicle speed sensor 58 preferably provides a speed signal to the EPS system controller 54. A rotational sensor 60 generates an angular position signal that is related to the angular position of the steering wheel 16, the upper steering shaft 20, and/or the wheel 52.

In use, the operator of the vehicle 10 turns the steering wheel 16 to change the direction of the vehicle 10. The torque sensor 24 senses the amount of effort that is required to turn the steering wheel 16. The rotational sensor 60 senses the rotational position of the steering wheel 16, the upper steering shaft 20 or the wheel 52. The EPS system controller 54 factors the sensed torque, the speed of the vehicle 10, and/or the angular orientation of the steering wheel 16, the upper steering shaft 20 or the position of the wheels 52. The EPS system controller 54 sends a control signal to the drive circuit 56 that generates a set of stator currents that in turn produce a rotating magnetic field in the stator windings of the permanent magnet motor 32. The rotor rotates in response to the rotating magnetic field in the stator windings.

Figure 2:
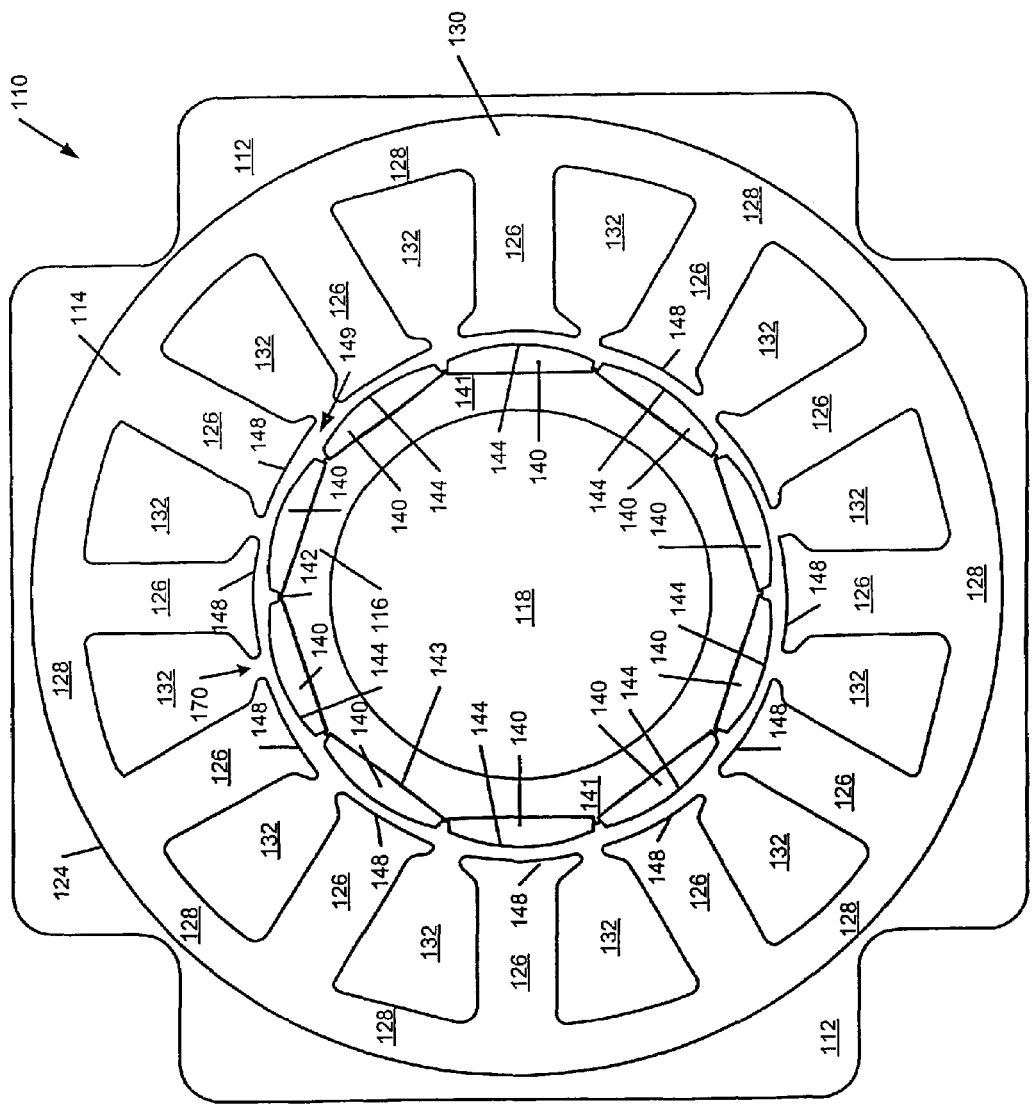
FIG. 2 illustrates a housing, a stator, a rotor and permanent magnets of the permanent magnet motor of FIG. 1A.

Referring now to FIG. 2, the permanent magnet motor 32 is illustrated and includes a housing 112, a stator 114, a rotor 116, and a shaft 118. The stator 114 is mounted on an inner surface 124 of the housing 112. The stator 114 includes a plurality of stator poles 126 that project radially inwardly from an outer rim 128 of the stator 114. The stator 114 includes a solid stator core or a laminated stator core. The laminated core includes a stack of stator plates that are interconnected in any suitable manner. While an unsegmented stator 114 is shown, a segmented stator can also be employed. One or more pairs of slits (not shown) are made in the stator plates when they are die cut and a central portion of the slits is deformed. The stator plates are stacked, and the central portions of the slits are press fit together. Alternately, the stack of stator plates can be connected together using adhesives, welding or any other suitable method.

The housing 112 and the stator 114 are assembled using press fit, hot drop or other suitable methods. In the hot drop method, the housing 112 is heated and expanded. The stator 114 is positioned using a fixture and the housing is "hot dropped" onto the stator 114. As the housing 112 cools, it contracts to provide an interference fit with the stator 114. In the press fit method, the stator 114 is positioned on the fixture and the housing 112 is press fit over the stator 114.

In FIG. 2, an outermost stator plate 130 of the stack is illustrated. The remaining stator plates 130 of the stack have a similar configuration as the outermost stator plate 130. Inter-polar stator slots 132 are located between adjacent stator poles 126. While not shown in FIG. 2, the stator 114 also includes winding wire that is wound around the stator poles 126 (using needle winding, transfer winding, computer numerical control (CNC) winding or other suitable winding methods) in the inter-polar stator slots 132. Opposite ends of the winding wire are connected to terminals that, in turn, are connected to the drive circuit. The terminals can be connected to end caps (not shown) that are connected on opposite face surfaces of the stack of stator plates. Alternately, the opposite ends of the winding wire can be connected directly to the drive circuit without the end caps and the terminals. Insulating material can also be positioned between the winding wire and the stator poles 126 and on outer surface of the winding wire on adjacent stator poles 126 in a conventional manner.

The rotor 116 includes one or more axial rotor sections. If more than one axial section is provided, it is preferably rotationally offset by an offset angle that is equal to the cogging angle divided by the number of axial rotor sections. The rotor 116 includes a rim section 141 and a radially outer surface 142 that includes magnet attachment surfaces 143 that may include grooves for receiving adhesive. Permanent magnets 140 are preferably adhered to the magnet attachment surfaces 143 on the radially outer surface 142 of the rotor 116. The permanent magnets 140 are preferably attached in an unmagnetized state and magnetized after assembly using a magnetizing fixture.

A radially outer crown surface 144 of the permanent magnets 140 and a radially inner surface 148 of the stator poles 126 define an air gap 149. The stator 114 has twelve stator slots 132 (or stator poles 126) and the rotor 116 has ten rotor poles (or permanent magnets 140) in first and second axial rotor sections. The 1.2 slot/pole ratio that is employed provides a relatively high cogging torque frequency. The higher cogging torque frequency can be reduced and/or eliminated more readily than the low-frequency, high-magnitude cogging torques that result from 1.5, 2, and 3 slot/pole ratios.

Referring now to FIG. 3, details relating to the attachment of the permanent magnets 140 to the rotor 116 are illustrated in further detail. The magnet attachment surfaces 143 include a groove 150 for receiving adhesive to attach the permanent magnets 140 to the radially outer surface 142 of the rotor 116. The radially outer surface 142 of the rotor 116 includes a projection 152 that is located between the adjacent magnet attachment surfaces 143. Referring now to FIG. 4, the permanent magnets 140 have a breadloaf shape. In one embodiment, the permanent magnets 140 have a thickness of 3.0 mm, a length of 21.0 mm, and a width of 15.1 mm. The radially outer crown surface 144 preferably has a radius of 19.0 mm. Opposite lateral edges 153 of the permanent magnets 140 have a thickness of 1.4 mm.

The permanent magnets 140 according to the present invention have a magnet dimension angle that is identified at 154. The magnet dimension angle 154 is measured from a center of the rotor 116 to the opposite lateral edges 153 of the radially outer crown surface 144 of the permanent magnets 140. The magnet dimension angle 154 according to the invention is preferably between 31 and 35 degrees for the motor 32 with the 12/10 slot/pole combination. In a preferred embodiment, the magnet dimension angle 154 is approximately 33 degrees.

Figure 5:
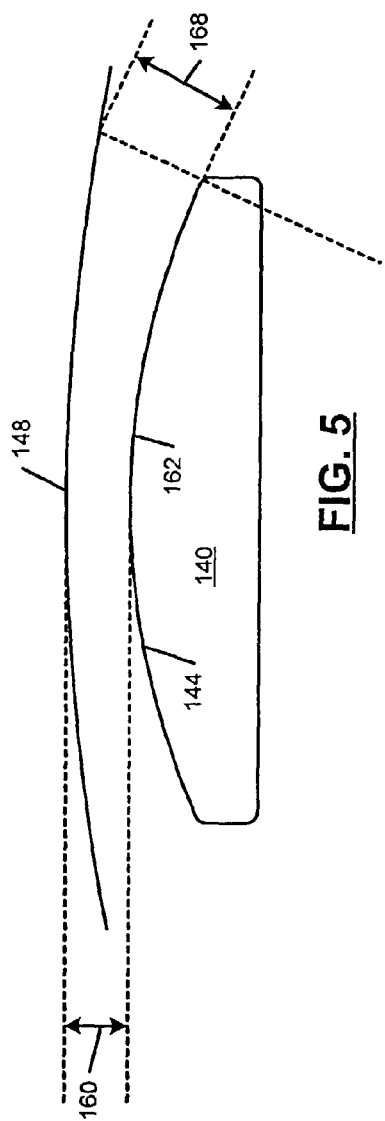
FIG. 5 illustrates a center gap and an edge gap of the permanent magnet of FIG. 4.

Referring now to FIG. 5, a center gap is identified at 160. The center gap 160 is a minimum distance between a peak 162 of the radially outer crown surface 144 of the permanent magnet 140 and the radially inner surface 148 of the stator 114. An edge gap is identified at 168. The edge gap 168 is defined as a distance between the lateral edge 153 of the radially outer crown surface 144 of the permanent magnet 140 and the radially inner surface 148 (or inner diameter) of the stator 114 taken along a radial line of the rotor. An air-gap ratio is defined as the edge gap 168 divided by the center gap 160. Preferably the air-gap ratio is between 1.0 and 2.5.

A slot opening ratio is defined as the width of the stator slot opening 170 divided by the edge gap 168. The slot opening ratio is preferably set approximately less than or equal to one. When the width of the stator slot opening 170 is wider than the edge gap 168, the motor 32 will produce a cogging torque with a relatively high magnitude.

Figure 7:
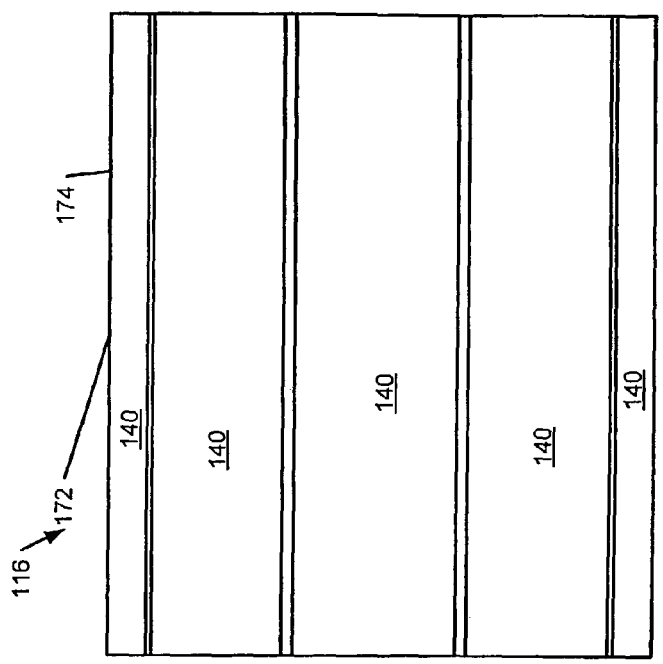
FIG. 7 illustrates the rotor of FIG. 2 with a single axial rotor section.
Figure 6B:
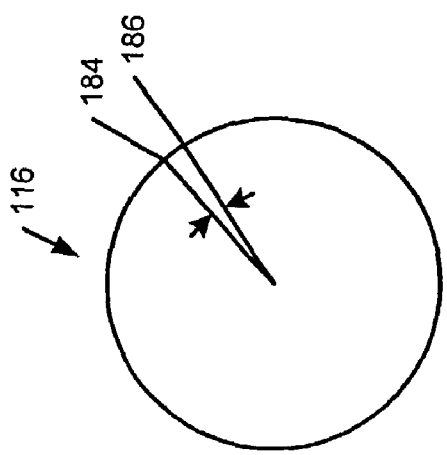
FIG. 6B illustrates a rotational offset angle of the first and second axial rotor sections of FIG. 6A.
Figure 6A:
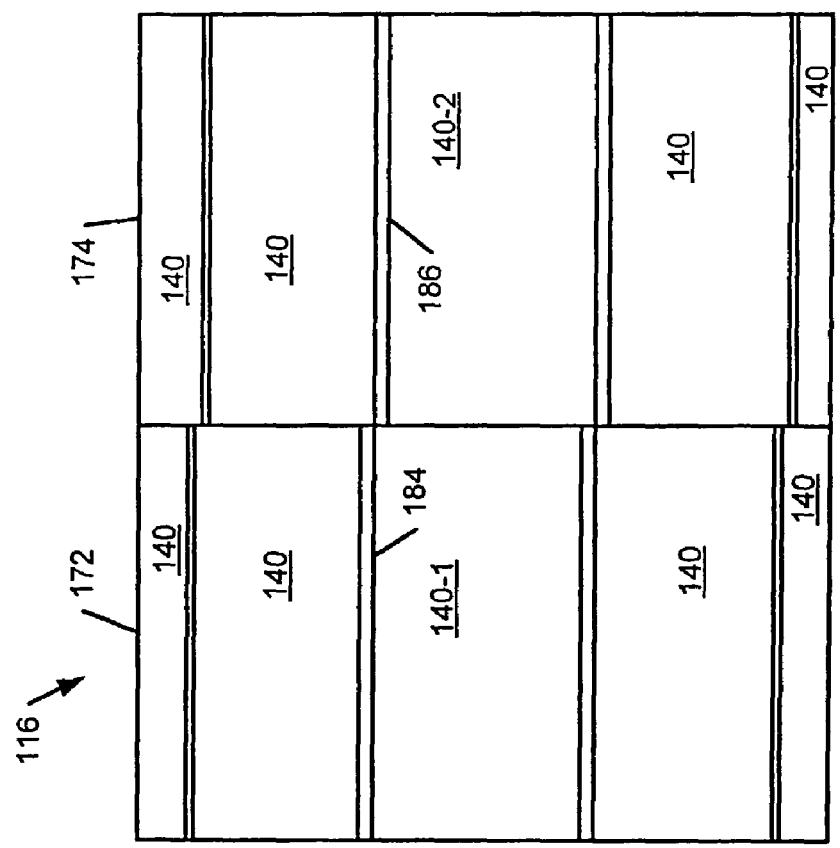
FIG. 6A illustrates the rotor of FIG. 2 with first and second axial rotor sections.

Referring now to FIG. 6A, the rotor 116 includes one or more axial rotor sections. In FIG. 6A, two axial rotor sections are shown. First and second axial rotor sections 172 and 174 are rotationally offset by one half of the cogging angle. The cogging angle is defined as the least common multiple of the number of stator slots and the number of rotor poles. In this case, the least common multiple of 12 and 10 is 60. 360 degrees divided by 60 is 6 degrees. A mechanical rotational offset angle of 3 degrees provides 180 (electrical) degree cancellation of the periodic cogging torque waveforms. If additional rotor sections are employed, the offset angle for all of the axial rotor sections is equal to the cogging angle divided by the number (n) of axial rotor sections. The rotational offset angle is 2 degrees if three axial rotor sections are employed. An edge 184 of the permanent magnet 140-1 of the axial rotor section 172 is rotationally offset by the offset angle from an edge 186 of the permanent magnet 140-2 of the axial rotor section 174 as is illustrated in FIGS. 6A and 6B. Referring now to FIG. 7, the rotor 116 can also include a single axial rotor section.

Figure 8:
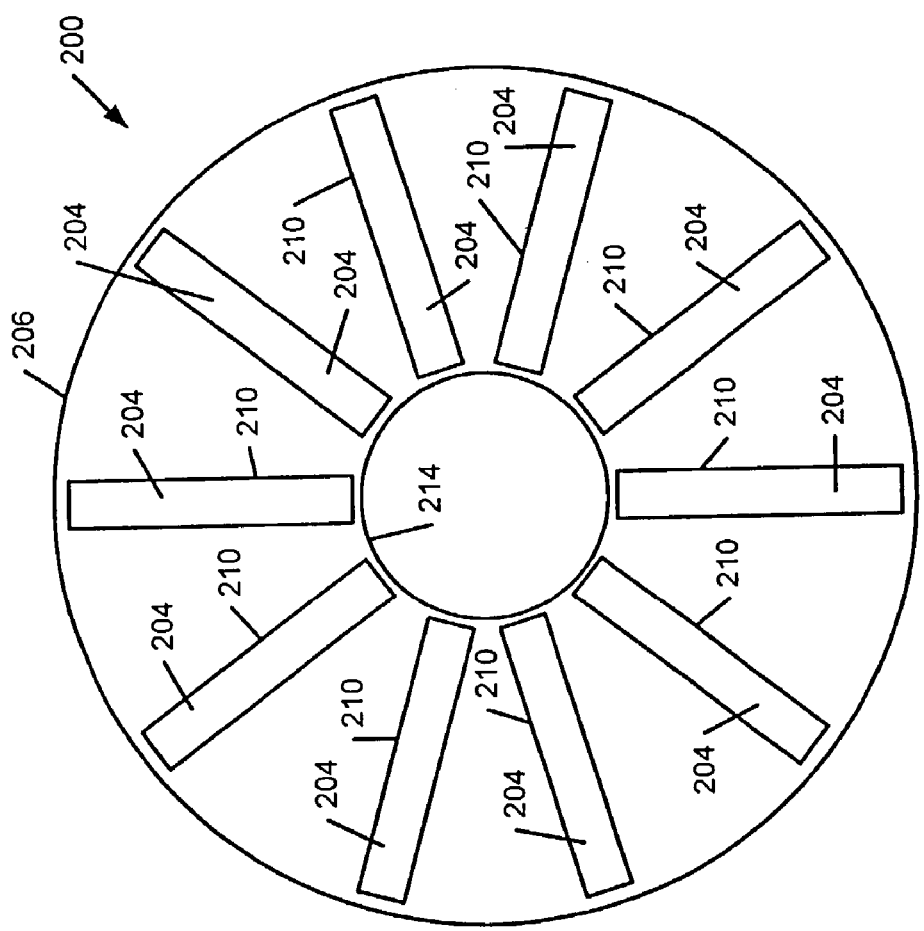
FIG. 8 illustrates a first alternate permanent magnet rotor with spoke magnets that can be used in the motor of FIG. 2.

Referring now to FIG. 8, a spoke magnet rotor 200 is illustrated and includes a plurality of spoke magnets 204 that are received by a rotor core 206. The rotor core 206 may be made of a solid core or a stack of laminations. In a first alternate embodiment, the spoke magnet rotor 200 replaces the rotor 116 in the motor 32 that is illustrated in FIG. 2. The stack of laminations are preferably connected together using adhesive, welding, press fit, or other conventional methods. The rotor core 206 includes a plurality of radial slots 210 that are formed therein and that are spaced at uniform angular intervals. In the preferred embodiment, the radial slots 210 are centered at 36 degree intervals. The radial slots 210 extend in an axial direction between opposite end surfaces of the rotor core 206. A center bore 214 of the rotor core 206 receives a shaft (not shown). As with the embodiments shown in conjunction with FIGS. 6A, 6B and 7, the spoke magnet rotor 200 includes one or more axial rotor sections. If more than one rotor section is used, they are rotationally offset as described above to reduce cogging torque. The plural axial rotor sections are preferably assembled separately and then mounted on a common shaft with the offset angle. The common shaft may include one or more keys that are made with grooves on the axial rotor sections. The offset angle is equal to the cogging angle divided by the number of axial rotor sections.

Figure 10:
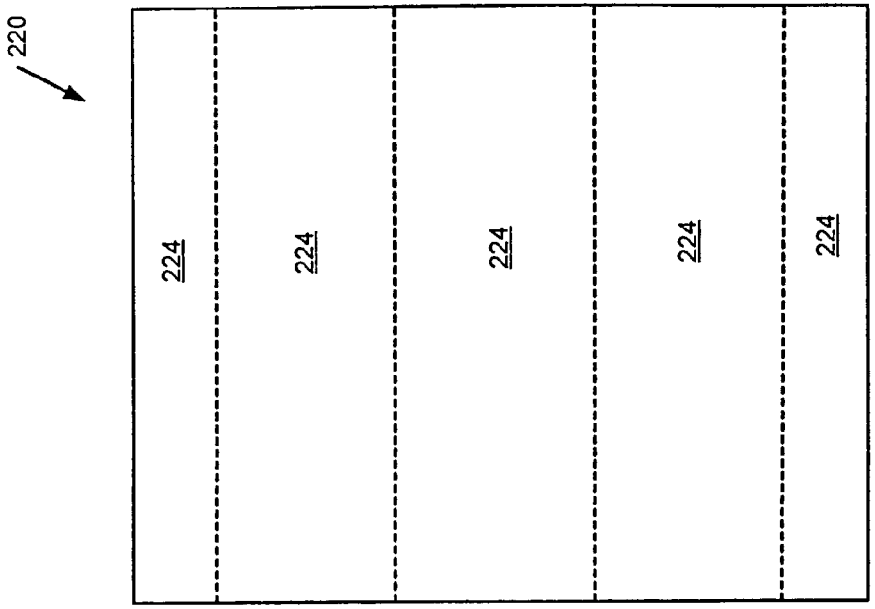
FIG. 10 is a plan view of the second alternate permanent magnet rotor of FIG. 9.
Figure 9:
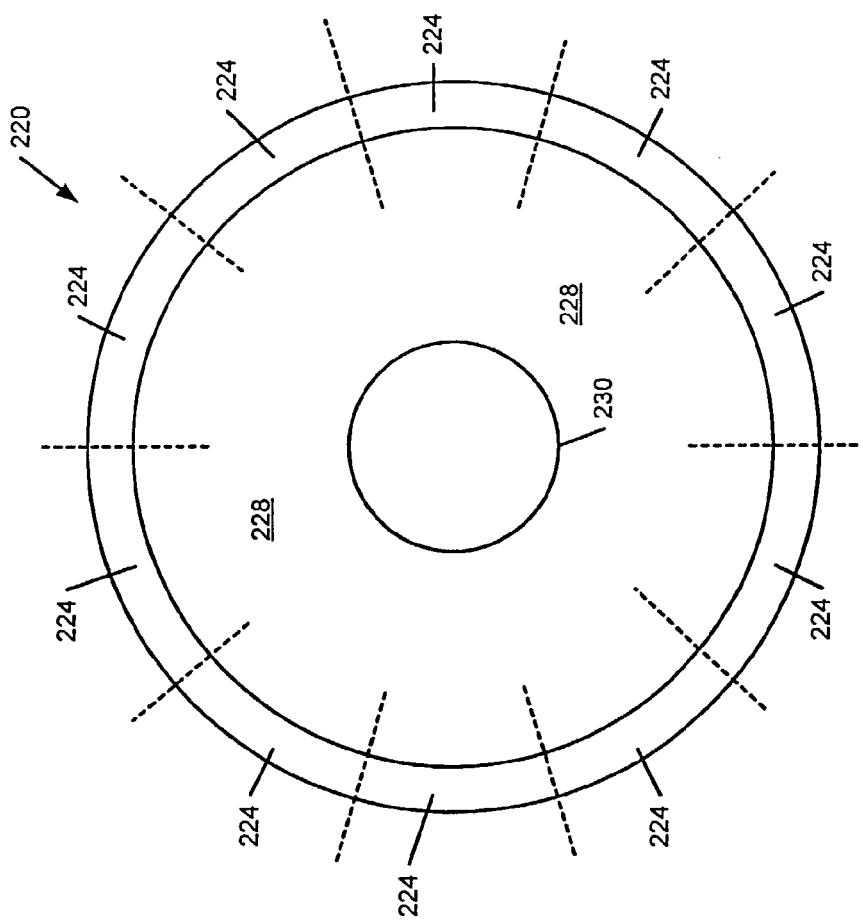
FIG. 9 illustrates a second alternate permanent magnet rotor that can be used in the motor of FIG. 2.

Referring now to FIGS. 9 and 10, a ring magnet rotor 220 is shown and includes a plurality of ring magnets 224 that are attached to an outer surface of the rotor core 228. In a second alternate embodiment, the ring magnet rotor 220 replaces the rotor 116 on the motor 32 that is illustrated in FIG. 2. The rotor core 228 includes a solid rotor core or a stack of laminations. The ring magnet rotor 220 includes one or more axial rotor sections. A center bore 230 of the rotor core 228 receives a shaft (not shown).

When ring magnets are employed, the magnetic properties are uniform around the outer surface of the rotor. Preferably, a skewed magnetizing fixture is used that has a skew angle that is equal to one half of the cogging angle. For arc and breadloaf magnets, multiple offset rotor sections are employed to obtain an effect that is similar to a ring magnet with skewed magnetization. When using ring magnets, a rotor built from multiple axial sections may be employed. The multiple axial sections are used, in part, because of magnet axial length restrictions that may be imposed by the magnet manufacturing processes.

Figure 12:
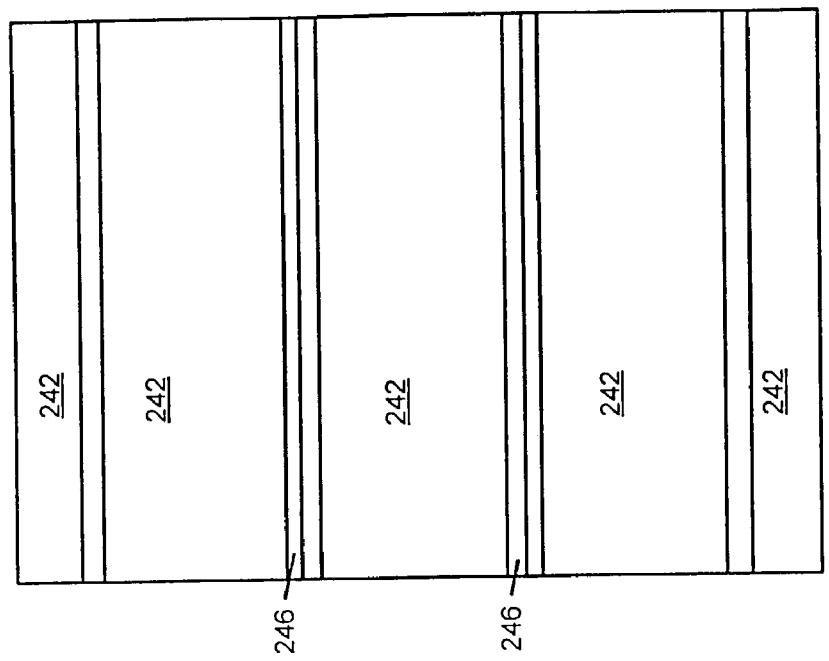
FIG. 12 is a plan view of the third alternate permanent magnet rotor of FIG. 11.
Figure 11:
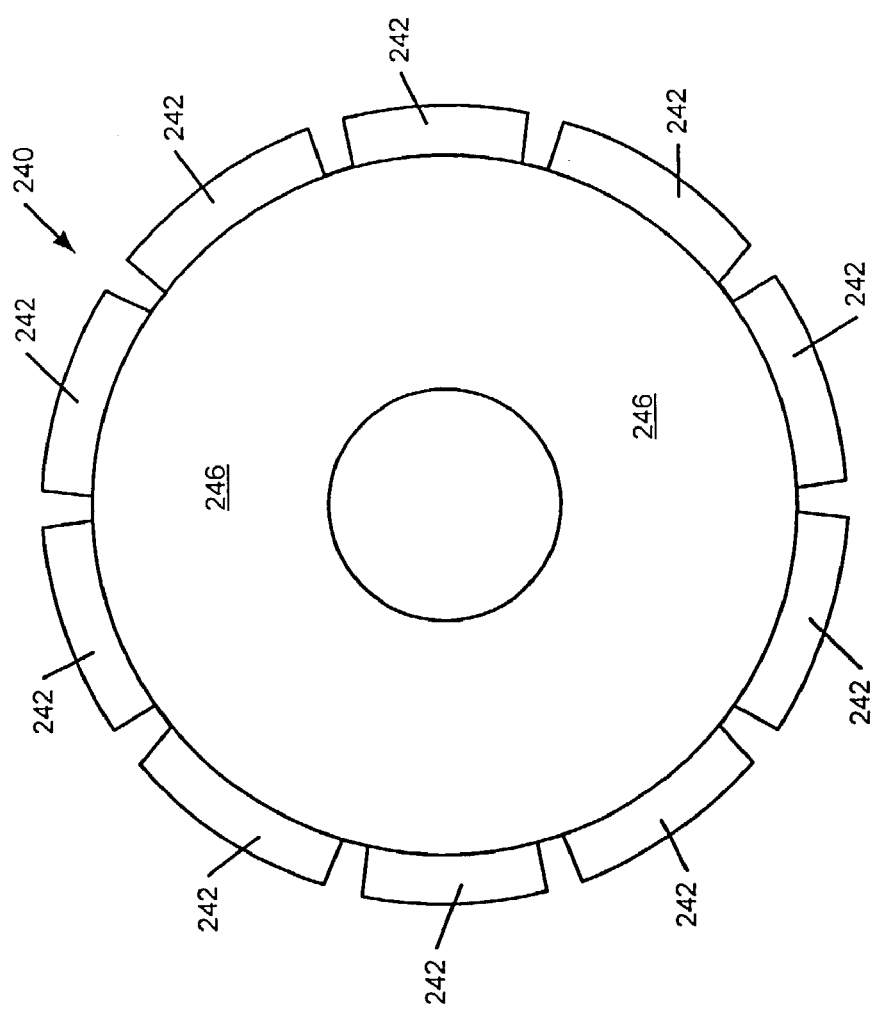
FIG. 11 illustrates a third alternate permanent magnet rotor that can be used in the motor of FIG. 2.

Referring now to FIGS. 11 and 12, an arc magnet rotor 240 is illustrated and includes a plurality of arc magnets 242 that are connected to a radially outer surface of the rotor core 246. In a third embodiment, the arc magnet rotor 240 replaces the rotor 116 in the motor 32 that is illustrated in FIG. 2. The rotor core 246 is composed of a solid rotor core or a stack of laminations. A center bore 250 of the rotor core 246 receives a shaft (not shown). The arc magnet rotor 240 includes one or more axial rotor sections. If plural axial rotor sections are employed, the axial rotor sections are offset by an offset angle that is equal to the cogging angle divided by the number of axial rotor sections. The additional axial rotor sections are assembled by duplicating the structure that is illustrated in FIGS. 11 and 12 and by mounting the axial rotor sections on a common shaft with the offset angle that is described above.

In a preferred embodiment, the permanent magnets of the axial rotor sections are magnetized after attachment to the rotor core. A magnetizing fixture includes a plurality of stacked laminations with slots. The stacked laminations are fastened together with an angular offset. Magnetizing coils are located in the slots and are connected to a magnetizing circuit.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. An electric power steering system for a vehicle comprising:
    a steering wheel;
    a steering shaft that is connected to said steering wheel;
    a permanent magnet motor coupled to said steering shaft that reduces driver effort that is required to turn said steering wheel, wherein said permanent magnet motor includes a stator with twelve slots and a rotor that rotates relative to said stator and includes ten poles and wherein an air-gap ratio between said rotor and said stator is between 1.0 and 2.5 and a magnet dimension angle of magnets of said rotor is between 31 and 35 degrees.

2. The electric power steering system of claim 1 further comprising:
    a worm gear that is connected to said steering shaft; and
    a worm threadably engaged to said worm gear.

3. The electric power steering system of claim 1 wherein said rotor includes a rotor core and breadloaf magnets that are attached to said rotor core.

4. The electric power steering system of claim 1 wherein said rotor includes ring magnets.

5. The electric power steering system of claim 4 wherein said ring magnets have a skew equal to one-half of the cogging angle.

6. The electric power steering system of claim 1 wherein said rotor includes n axial rotor sections.

7. The electric power steering system of claim 6 wherein n is an integer greater than one.

8. The electric power steering system of claim 6 wherein said n axial rotor sections are rotationally offset by an offset angle that is equal to a cogging angle divided by n.

9. The electric power steering system of claim 8 wherein said permanent magnet motor has n cogging torque waveforms that are substantially periodic and that are associated with said n axial rotor sections, and wherein said cogging torque waveforms substantially cancel.

10. The electric power steering system of claim 9 wherein said axial rotor sections include a rotor core and breadloaf magnets that are attached thereto.

11. The electric power steering system of claim 9 wherein a slot opening ratio is less than or equal to 1.0.

12. The electric power steering system of claim 3 wherein said axial rotor sections include a rotor core and arc magnets that are attached to said rotor core and wherein a slot opening ratio is less than or equal to 1.0.

13. An electric power steering system for a vehicle comprising:
    a steering wheel;
    a steering shaft that is connected to said steering wheel;
    a permanent magnet motor that is coupled to said steering shaft and that reduces driver effort required to turn said steering wheel, wherein said permanent magnet motor includes a stator with twelve slots and a rotor with ten poles and n axial rotor sections and an air-gap ratio between said rotor and said stator is between 1.0 and 2.5 and a magnet dimension angle of magnets of said rotor is between 31 and 35 degrees, wherein said permanent magnet electric motor has n cogging torque waveforms that are substantially periodic and that are associated with said n axial rotor sections, and wherein said cogging torque waveforms substantially cancel.

14. The electric power steering system of claim 13 further comprising:
    a worm gear that is connected to said steering shaft; and
    a worm threadably engaged to said worm gear.

15. The electric power steering system of claim 13 wherein said n axial rotor sections are rotationally offset by an offset angle that is equal to a cogging angle divided by n.

16. The electric power steering system of claim 13 wherein said rotor is selected from a first rotor core with breadloaf magnets that are attached to said first rotor core and a second rotor core with arc magnets that are attached to said second rotor core.

17. The electric power steering system of claim 16 wherein a slot opening ratio is less than or equal to 1.0.

18. The electric power steering system of claim 13 wherein said rotor includes a rotor core with ring magnets.

* * * * *

UNITED STATES PATENT AND TRADEMARK OFFICE
CERTIFICATE OF CORRECTION

| | |
|---|---|
| PATENT NO. | : 7,034,423 B2 |
| APPLICATION NO. | : 10/431263 |
| DATED | : April 25, 2006 |
| INVENTOR(S) | : Alan D. Crapo et al. |

It is certified that error appears in the above-identified patent and that said Letters Patent is hereby corrected as shown below:

On the Title Page,
Title page, item No. (56), References Cited, U.S. Patent Documents, please insert the following references:

| | | |
|---|---|---|
| 606,912 | 7/5/1898 | O.T. Blathy & K. De Kando |
| 2,435,911 | 2/10/1948 | F. R. Van Der Woude |
| 3,979,821 | 9/14/1976 | Noodleman |
| 4,642,502 | 2/10/1987 | Carpenter et al. |
| 4,714,852 | 12/22/1987 | Kawada et al. |
| 4,739,203 | 4/19/1988 | Miyao et al. |
| 4,782,259 | 11/1/1988 | Shikama et al. |
| 4,845,837 | 7/11/1989 | Lloyd |
| 4,868,438 | 9/19/1989 | Okamoto et al. |
| 4,871,934 | 10/3/1989 | Okamoto et al. |
| 4,933,584 | 6/12/1990 | Hams et al. |
| 4,953,284 | 9/4/1990 | Hammer et al. |
| 5,006,745 | 4/9/1991 | Nishio et al. |
| 5,034,642 | 7/23/1991 | Hoemann et al. |
| 5,093,595 | 3/3/1992j | Korbel |
| 5,164,622 | 11/17/1992 | Kordik |
| 5,250,867 | 10/5/1993 | Gizaw |
| 5,302,876 | 4/12/1994 | Iwamatsu et al. |
| 5,388,658, | 2/1995 | Ando |
| 5,397,951 | 3/14/1995 | Uchida et al. |
| 5,563,463 | 10/8/1996 | Stark |
| 5,610,464 | 3/11/1997 | Asano et al. |
| 5,886,440 | 3/23/1999 | Hasebe et al. |
| 6,031,304 | 2/29/2000 | Suzuki et al. |
| 6,034,459 | 3/7/2000 | Matsunobu et al. |
| 6,034,460 | 3/7/2000 | Tajima et al. |
| 6,040,647 | 3/21/2000 | Brown et al. |
| 6,049,153 | 4/11/2000 | Nishiyama et al. |
| 6,104,117 | 8/15/2000 | Nakamura et al |
| 6,127,753 | 10/3/2000 | Yamazaki et al. |
| 6,226,856 | 5/8/2001 | Kazama et al. |
| 6,300,700 | 10/9/2001 | Nishiyama et al. |
| 6,384,503 | 5/7/2002 | Iwaki et al. |
| 6,388,353 | 5/14/2002 | Liu et al. |
| 6,462,452 | 10/8/2002 | Nakano et al. |

UNITED STATES PATENT AND TRADEMARK OFFICE
CERTIFICATE OF CORRECTION

PATENT NO. : 7,034,423 B2
APPLICATION NO. : 10/431263
DATED : April 25, 2006
INVENTOR(S) : Alan D. Crapo et al.

It is certified that error appears in the above-identified patent and that said Letters Patent is hereby corrected as shown below:

Title page, col. 2 under item [56]
FOREIGN PATENT DOCUMENTS

| | | |
|---|---|---|
| JP | JP61199446 | 3/9/1986 |
| JP | JP60013455 | 23/1/1985 |
| JP | JP61199447 | 3/9/1986 |
| JP | JP63140645 | 13/6/1988 |
| EP | EP300042 | 25/1/1989 |
| EP | EP0392028 | 17/10/1890 |
| EP | EP0449538A1 | 2/10/1991 |
| EP | EP0483372A1 | 6/5/1992 |
| EP | EP0564759A1 | 13/10/1993 |
| WO | WO 01/95459 A1 | 12/13/2001 |

Title page, under Foreign Pat. Doc., OTHER PUBLICATIONS

Ackermann/Janssen/Sottek/van Steen, "XP-002209198 New Technique for Reducing Cogging Torque in a Class of Brushless DC Motors, IEEE Proceeding-B, Vol. 139, No. 4, July 1992, pp. 315-320.

Bianchi/Bolognani, "Design Techniques for Reducing the Cogging Torque in Surface-Mounted PM Motors", Department of Electrical Engineering, University of Padova, 2000.

Chen/Bruhl, "XP-000833296 The Robust Design Approach for Reducing Cogging Torque in Permanent Magnet Motors", IEEE Transactions on Magnetics, Vol. 34, No. 4, July 1998, pp. 2135-2137.

Zhu/Howe, "XP-002206342 Influence of Design Parameters on Cogging Torque in Permanent Magnet Machines", IEEE Transactions on Energy Conversion, Vol. 15, No. 4, December 2000, pp. 407-412.

UNITED STATES PATENT AND TRADEMARK OFFICE
CERTIFICATE OF CORRECTION

PATENT NO. : 7,034,423 B2
APPLICATION NO. : 10/431263
DATED : April 25, 2006
INVENTOR(S) : Alan D. Crapo et al.

It is certified that error appears in the above-identified patent and that said Letters Patent is hereby corrected as shown below:

Title page, under Foreign Pat. Doc., OTHER PUBLICATIONS (cont'd)

Zhu/Howe, "XP-002206342 Influence of Design Parameters on Cogging Torque in Permanent Magnet Machines", IEEE Transactions on Energy Conversion, Vol. 15, No. 4, December 2000, pp. 407-412.

Signed and Sealed this

Seventh Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,034,423 B2 |
| APPLICATION NO. | : 10/431263 |
| DATED | : April 25, 2006 |
| INVENTOR(S) | : Alan D. Crapo et al. |

It is certified that error appears in the above-identified patent and that said Letters Patent is hereby corrected as shown below:

<u>On the Title Page,</u>
Item (73) Assignee, please insert --(73) Assignee: Emerson Electric Co., St. Louis, MO (US)--.

Signed and Sealed this

Twenty-third Day of October, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,034,423 B2 |
| APPLICATION NO. | : 10/431263 |
| DATED | : April 25, 2006 |
| INVENTOR(S) | : Alan D. Crapo et al. |

It is certified that error appears in the above-identified patent and that said Letters Patent is hereby corrected as shown below:

This certificate supersedes the Certificate of Correction issued October 23, 2007. The certificate should be vacated since petition to correct assignee was granted for this patent number.

Signed and Sealed this

Third Day of February, 2009

JOHN DOLL
*Acting Director of the United States Patent and Trademark Office*